Feb. 9, 1960 G. H. RUBIN 2,923,943
EYE SHIELDS
Filed Dec. 9, 1957

INVENTOR.
GEORGE H. RUBIN
BY
Gerald P. Welch
ATTORNEY

United States Patent Office 2,923,943
Patented Feb. 9, 1960

2,923,943

EYE SHIELDS

George H. Rubin, South Milwaukee, Wis.

Application December 9, 1957, Serial No. 701,433

1 Claim. (Cl. 2—13)

This invention relates to improvements in eye shields and more particularly to a novel eye shield adapted to be used in conjunction with conventional spectacles.

An object of the invention is to provide a device of the type which may be temporarily affixed to a pair of eye glasses and which will shield the eyes of the user from light from above and to the sides of the line of vision.

Another object of the invention is to provide a device of the type which will have simple and efficient means for clipping the same in place on a pair of eyeglasses.

Other and further objects of the invention will appear as the description proceeds, reference being had to the accompanying drawing, in which.

Figure 1:
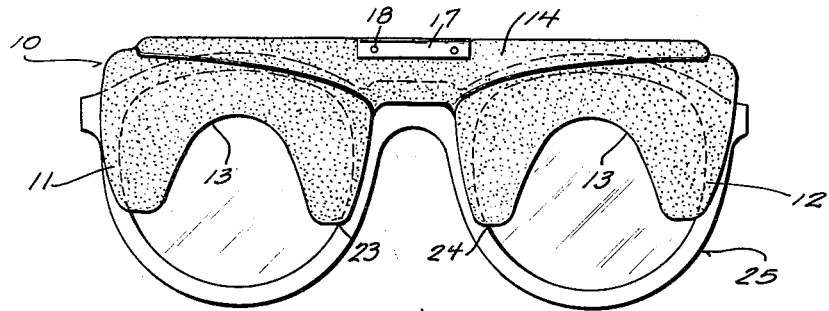
Fig. 1 is a front view in elevation of an eye shield embodying the invention in place on a pair of spectacles.
Figure 2:
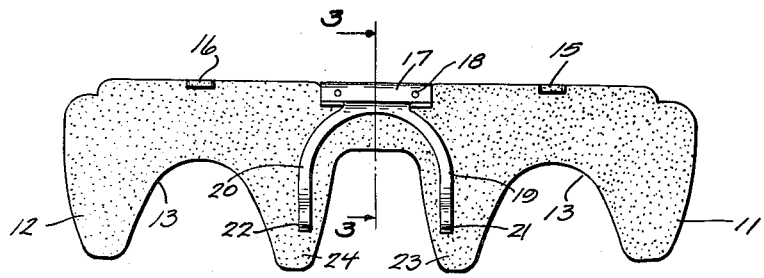
Fig. 2 is a rear view in elevation of the shield.
Figure 3:
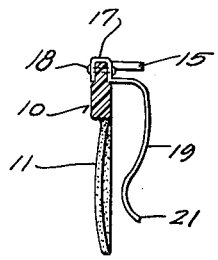
Fig. 3 is a cross-sectional view on line 3—3 of Fig. 2.

Referring more particularly to the drawing, the numeral 10 refers to the device generally, including a pair of eye pieces 11 and 12, each having an arcuate cutout as at 13 of the lower portion thereof. The eye pieces 11 and 12 are formed of material of limited transparency and are joined at the top by an integral reinforcing rib 14. A pair of integral lugs 15 and 16 extend rearwardly from the rib 14 and serve to rest the device on the upper surfaces of a conventional eyeglass frame. Each of the eye pieces 11 and 12 includes a relatively thick top portion, and depending side pieces formed on either side of the cut-out portions 13, each of the side pieces having a transverse width which is at least equal to the height of the top portion, and each extending below the central horizontal axis of the lens and below the normal line or horizontal vision on either side of the pupil of a wearer to form shields against the admission of side light, the arrangement being such that when the wearer holds his head slightly forward, the translucent top portion is positioned directly in the line of sight in the plane of horizontal vision.

A channel bracket 17 is affixed by rivet or other means 18 to the upper central portion of the device 10. A pair of spring elements 19 and 20 are attached to the channel bracket 17, depending downwardly therefrom and have outwardly curved lower end portions 21 and 22, the said spring elements normally maintaining contact with the inner lower pointed portions 23 and 24 of the eye pieces 11 and 12 when the device 10 is not in place on a pair of eyeglasses.

In use, as shown in Fig. 1, the shield 10 is placed frontally over a pair of eyeglasses 25, by resting the lugs 15 and 16 on the tops of the lens frame portions and engaging the members 19 and 20 rearwardly of the lenses with their end portions 21 and 22 bearing thereon to retain the shield in place.

It will be understood that the device is capable of many modifications in structure and design without departing from the spirit of the invention, within the scope of the appended claim.

Having thus described the invention, what is claimed and desired to be secured by Letters Patent of the United States, is:

An eye shield adapted to be positioned over the lenses of a pair of spectacles comprising a pair of translucent eye pieces, said means including means connecting said eye pieces, a top frontal horizontal rib connected to each eye piece, and means carried by said rib for associating the eye shield with the head of a wearer with the eye pieces in the line of vision, each of said eye pieces comprising a horizontal top portion of substantial height adapted to be normally positioned immediately above the plane of the normal line of horizontal vision of a wearer, each eye piece having a central arcuate cut out portion in the plane of the horizontal line of vision and extending above the central horizontal axis of a lens, said cut out portion forming a pair of relatively wide integral translucent side pieces, each of a transverse width at least equal to the height of the top portion and each depending below the central horizontal axis of a lens and below the normal line of horizontal vision and adapted to depend on either side of the pupil of a wearer and forming shields against the admission of side light, whereby tilting of the head slightly forwardly positions the translucent top portion directly in the line of sight in the plane of horizontal vision.

References Cited in the file of this patent

UNITED STATES PATENTS

| | | |
|---|---|---|
| 1,280,515 | Mauhart | Oct. 1, 1918 |
| 1,588,685 | Orriss | June 15, 1926 |
| 1,794,927 | Smith | Mar. 3, 1931 |
| 1,911,842 | Naulty | May 30, 1933 |
| 2,516,764 | Ehlert | July 25, 1950 |